March 14, 1967 R. FROHMAN 3,309,666

TRANSISTORIZED PARITY BIT GENERATING AND CHECKING CIRCUIT

Original Filed Oct. 22, 1958 2 Sheets-Sheet 1

INVENTOR:
Robert Frohman
By Louis A. Kline
John J. Matlago
His Attorneys

March 14, 1967 R. FROHMAN 3,309,666

TRANSISTORIZED PARITY BIT GENERATING AND CHECKING CIRCUIT

Original Filed Oct. 22, 1958 2 Sheets-Sheet 2

INVENTOR
Robert Frohman
By Louis A Kline
John T. Matlago
His Attorneys

United States Patent Office 3,309,666
Patented Mar. 14, 1967

3,309,666

TRANSISTORIZED PARITY BIT GENERATING AND CHECKING CIRCUIT

Robert Frohman, Sunnyvale, Calif., assignor to The National Cash Register Company, Dayton, Ohio, a corporation of Maryland Continuation of application Ser. No. 769,034, Oct. 22, 1958. This application Mar. 23, 1966, Ser. No. 536,925
3 Claims. (Cl. 340—146.1)

This application is a continuation of copending patent application Ser. No. 769,034, filed Oct. 22, 1958, now abandoned, and a continuation-in-part of patent application Ser. No. 625,847, filed Dec. 3, 1956, now United States Patent No. 3,001,711.

The present invention relates to electronic parity bit generators, and more particularly to an improvement in apparatus for use in generating parity signals for binary coded characters and for providing parity checks of signals representing the characters.

The operations performed by a binary digital computer in the solution of a problem generally involve a large number of transfers of information signals representing binary coded characters from one storage medium to another, and it has been shown that many erroneous results in a computation are due to errors that are introduced into the computing equipment during such transfers. Thus, it is highly desirable to provide a means for checking the code signals of the characters during the transfer operations so as to detect such errors as they occur and warn the operator of the equipment that the operation should not be continued. A parity bit generator accomplishes this objective by generating a parity bit signal in the form of a binary digit one or zero for insertion in a parity check position included as a part of the code signals representing each character, so that the sum of all the binary digit ones is always odd, or, if desired, even. If the number of ones in each binary coded character is chosen to be odd, it is called odd parity; and if the number of ones in each binary character is chosen to be even, it is called even parity.

Because of the large number of binary digits or bits employed to represent each of the characters, such as, for example, the seven binary digits utilized to distinguish all the characters in an alphanumeric code, parity generators developed in the past for the purpose of providing a parity check of a parallel bit code have generally required a large number of components, such as diodes, arranged in logical "and" and "or" networks which respond to signals representing not only the true forms of the binary code signals but also their complemented forms. In addition, some of these networks are arranged to respond to outputs of other networks in order to provide the desired output signal. The use of a large number of components in such an arrangement introduces distributed capacitance into the circuits which slows up their overall signal response time, thus limiting the repetition rate at which the circuits can reliably operate. Further, the use of a large number of components consumes a greater amount of power and is more likely to increase the possibility of circuit failures than if fewer components could be used to perform the same overall function.

It is, therefore, an object of this invention to provide an improvement in apparatus employed for mechanizing a parity bit generator which operates to generate a parity signal in response to a parallel code of an alphanumeric character.

Another object of this invention is to provide a relatively simple and efficient parity bit generator that utilizes a plurality of substantially identical comparing circuits, each having a fast signal response characteristic such that the desired parity bit signal for a parallel bit coded character can be generated with substantially no delay.

Briefly, the parity bit generator of the present invention comprises a pyramidally connected arrangement of a plurality of comparing circuits. Each of these comparing circuits is of a type comprising either two NPN transistors or two PNP transistors. Each comparing circuit has two inputs and one output, and is operated in response to high or low potential level signals impressed on its inputs, indicative of binary signals that are being compared. Each comparing circuit, comprising two PNP transistors, is arranged to produce a high output potentional level when a high input potential level is applied to one input and a low input potential level is applied to the other input; and to produce a low output potential level when either a high input potential level is applied to both inputs or a low input potential level is applied to both inputs. Each comparing circuit, comprising two NPN transistors, is arranged to produce a low output potential level when a high input potential level is applied to one input and a low input potential level is applied to the other input; and to produce a high output potential level when either a high input potential level is applied to both inputs or a low input potential level is applied to both inputs.

In general, comparing circuits of one of the above described types are used to form the parity generator of the present invention. The arrangement is such that a comparing circuit is provided to respond to each pair of digits or bits representing the parallel code. Pairs of outputs of these comparing circuits are in turn connected to be impressed on the inputs of similar comparing circuits, whose outputs are again compared in a similar fashion until a signal representing the desired parity bit is provided. The comparing circuits are sufficiently fast-acting so that the signals can be combined to form the desired parity bit signal with a minimum of delay such that the generated parity bit signal effectively appears synchronously with the parallel code signals by which it was produced.

The above and other features of the invention which are believed to be new are set forth with particularity in the appended claims. The invention itself, however, together with further objects and advantages thereof, may best be understood by reference to the following description when read in conjunction with the accompanying drawings in which:

Figure 1:
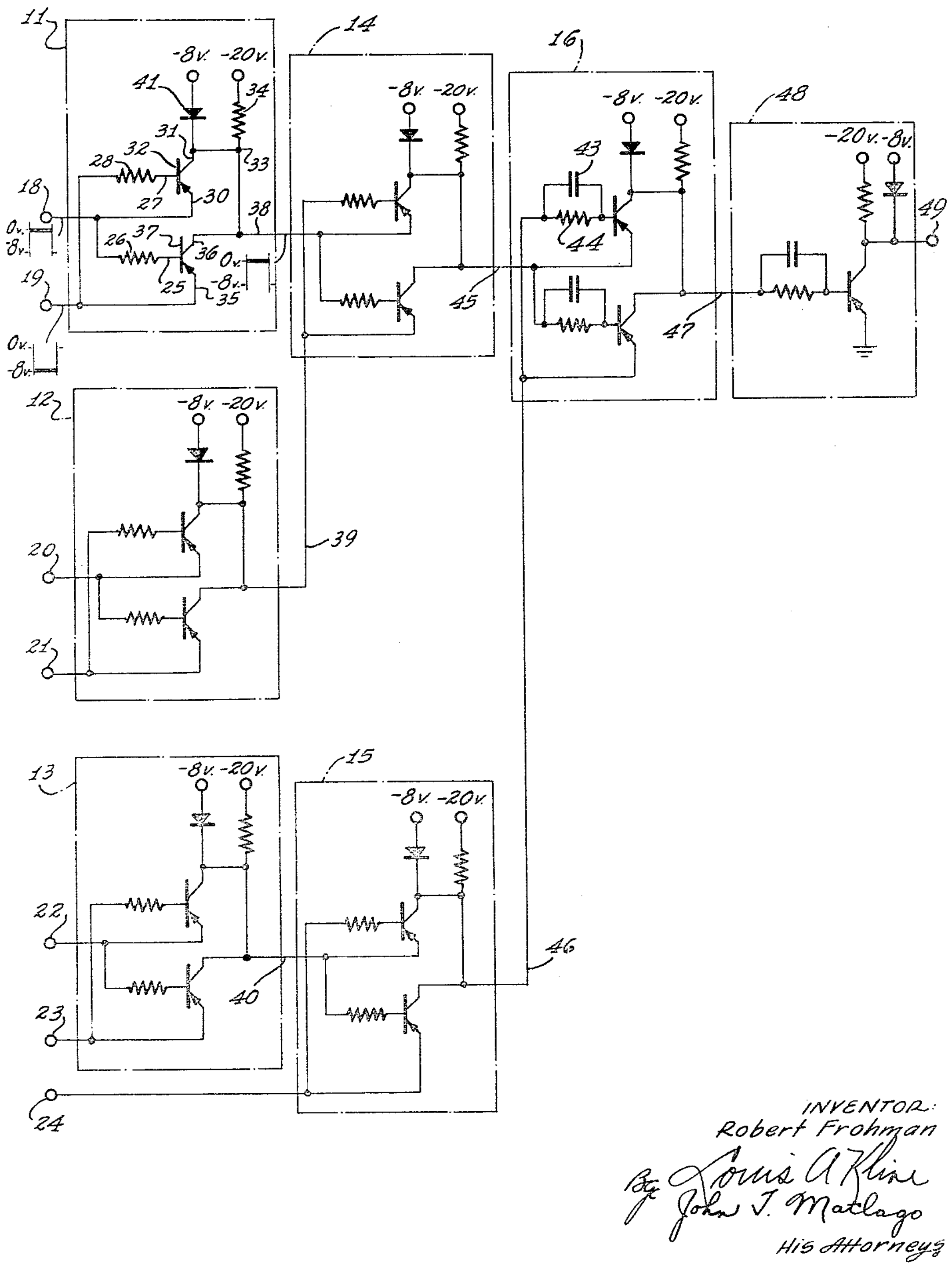
FIG. 1 is a schematic diagram of the preferred embodiment of a parity bit generator comprising PNP transistors in accordance with the present invention.

Referring now to the drawings, FIG. 1 shows a pyramidally connected arrangement of comparing circuits 11, 12, 13, 14, 15, and 16. Each of these comparing circuits is of the type comprising two PNP transistors, and has two inputs and one output. Thus, noting comparing circuit 11 in particular, it has inputs 18 and 19 and an output 38. Input 18 is connected to the base 25 of transistor 37 by way of a current limiting resistor 26 and is also connected directly to the emitter 30 of transistor 32. The input 19 is connected to the base 27 of transistor 32 by way of current limiting resistor 28 and is also connected directly to the emitter 35 of transistor 37. The collectors 31 and 36 of transistors 32 and 37, respectively, are connected to junction 33 which in turn is connected to a —20 v. source by way of a resistor 34. Junction 33 may be clamped by a clamping diode 41 so as to prevent it from falling below —8 volts. The output 38 is also connected to junction 33. This circuit 11 functions to respond to two of the seven binary bit signals representing the parallel code of an alphanumeric character. In accordance with the present embodiment of the invention, when a bit signal is at the high potential level of 0 volts it represents a binary code digit one and when the bit signal is at the low potential level of −8 volts it represents a binary code digit zero. The circuit 11 in effect compares the binary bit signals received on its inputs 18 and 19 and provides on its output 38 a signal indicative of the comparison. Thus, when the signal on input 18 is high in potential and the signal on input 19 is low in potential, the signal on output 38 is at the high potential due to the current flowing from emitter 30 to collector 31 of transistor 32 and through resistor 34 to the −20 v. source, diode 41 being back-biased and hence cut-off; and when the signal on input 18 is low in potential and the signal on input 19 is high in potential, the signal on the output 38 is at the high potential due to current flowing from emitter 35 to collector 36 of transistor 37 and through resistor 34 to the −20 v. source. It should be noted that if the signals on the inputs 18 and 19 are both high or both low in potential, neither of the transistors conduct since their emitters and bases are at the same potential. Under these conditions the low clamping potential of −8 volts is present on output 38. Thus, when the input signals applied to one of the comparing circuits of FIG. 1 are at different potential levels, the output signal therefrom is high in potential. If the input signals applied to the comparing circuit are at the same potential level, either both high or both low in potential, neither transistor conducts and the output signal therefrom is low in potential. The details of the transistorized comparing circuit herein described are not a part of the present invention, having been previously described and claimed in a co-pending application of Robert Frohman, Ser. No. 625,847, filed Dec. 3, 1956, now United States Patent No. 3,001,711. The present invention is primarily concerned with combining these comparing circuits to provide a parity signal generator.

In the embodiment of the present invention, comparing circuits 11, 12, and 13 each simultaneously respond to two of the binary bit signals included in the seven bit parallel code describing each alphanumeric character, and the outputs of these comparing circuits thus are high or low in potential depending on the comparison of the inputs. A comparing circuit 15, which is identical to the others, has one input 24 responding to the seventh bit signal of the code character and its other input connected to the output 40 of the comparing circuit 13. A comparing circuit 14 has its inputs connected to the outputs 38 and 39 of the comparing circuits 11 and 12, respectively. A final comparison circuit 16 has its inputs connected to the outputs 45 and 46 of comparing circuits 14 and 15, respectively, so as to provide the final result of the overall comparison representing the parity bit signal on the output 47 therefrom. It should be noted that this final signal is utilized as the parity bit if an even parity check is desired for the characters; otherwise an inverter 48 is provided for inverting the signal if an odd parity check is desired.

The use of transistors in the comparing circuit enables the desired comparison operation to be accomplished by responding to signals corresponding to only the true (or false) form of the bit signals representing the coded character. No components are needed to respond to the complemented form of the binary digits or bits, as is usual in more conventional circuitry of the type employing diodes, for example, to perform the comparison operations. Thus one of the features of this transistor form of a comparing circuit is that a small number of components is required, thus reducing the distributed capacitance of the circuit and minimizing the transient problems so as to enable the circuit to have a fast response time. It should be noted in connection herewith that other expediencies, well known in the art, can be utilized, if necessary, to speed up the signal response of the circuit, such as providing a capacitor 43 in parallel with the limiting resistor 44 on the input of comparing circuit 16.

By way of example of the operation of the circuit, if the high or low potential levels representing each of the seven bits of the binary character 1100101 are simultaneously applied to the inputs 18 to 24, respectively, of the comparing circuits, the output 49 will be at a high potential level. This high potential level represents the parity bit signal for a desired odd parity check of the characters and is inserted in a parity check position provided as part of the transferred character as an eighth bit so that the binary coded character will be represented by the parallel code digits 11100101. If an even parity were desired, the potential level on output 47 would represent the parity bit signal to be included with the transferred character. By way of further example, if the high and low potential levels representing each of the seven bits in the binary character 1100111 are applied to the inputs 18 to 24, respectively, of FIG. 1, output 49 will be at the low potential level, and will thus provide a 0 for insertion as the eighth bit in the parity check position of the transferred character, so that the binary character will become 01100111, satisfying the desired odd parity check. Again, if even parity were desired, the signal on output 47 would be used instead of output 49.

When it is desired to check a binary coded character having odd parity during a transfer operation, for example, the coded signals are fed into another parity bit generator functioning this time as an indicator for checking the parity of the characters. Such a parity bit generator would be constructed so as to energize an error light, for example, whenever one of the binary characters fed into it does not have the desired odd or even parity. In this manner it is possible to detect the fact that the computer has erroneously transferred a character.

The number of inputs of the parity generator of the present invention can be easily varied to accommodate the different number of bits used to represent a coded character. Thus, if an eight parallel bit character code were to be checked for parity, eight inputs for the code signals would be provided instead of the seven of FIG. 1, and input 24 would be applied with the eighth input to an additional comparing circuit provided along with the other first order comparing circuits 11, 12, and 13. The output of the additional comparing circuit would then be applied to one of the inputs of comparing circuit 15 and compared directly with the output 40 of comparing circuit 13, which would be applied to the other input thereof. If a six parallel bit character code were to be checked for parity, the output 40 of comparing circuit 13 would be applied directly to one of the inputs of comparing circuit 16 and compared directly with the output 45 of comparing circuit 14, which would be applied to the other input thereof.

Figure 2:
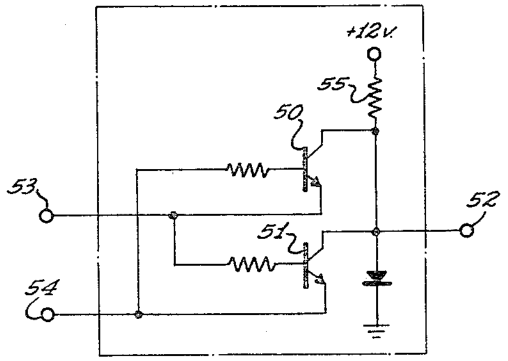
FIG. 2 is a schematic diagram of a comparing circuit comprising NPN transistors.

FIG. 2 shows how comparing circuits comprised of two NPN transistors can be used to provide a parity generator in accordance with the present invention. The inputs are connected to the base and emitters of the NPN transistors 50 and 51 in the same manner as described and shown for the PNP transistors of the comparing circuits of FIG. 1. Here, however, the load resistor 55 is returned to a +12 volt source and the output 52 is clamped at ground potential. The operation of this form of comparing circuit is such that the output 52 will be at the low potential level (−8 volts) when a high potential level (0 volts) is applied to either one of inputs 53 or 54, and output 52 will be at the high potential level when a high potential level is applied to both, or a low potential level is applied to both, of the inputs 53 and 54.

Figure 3:
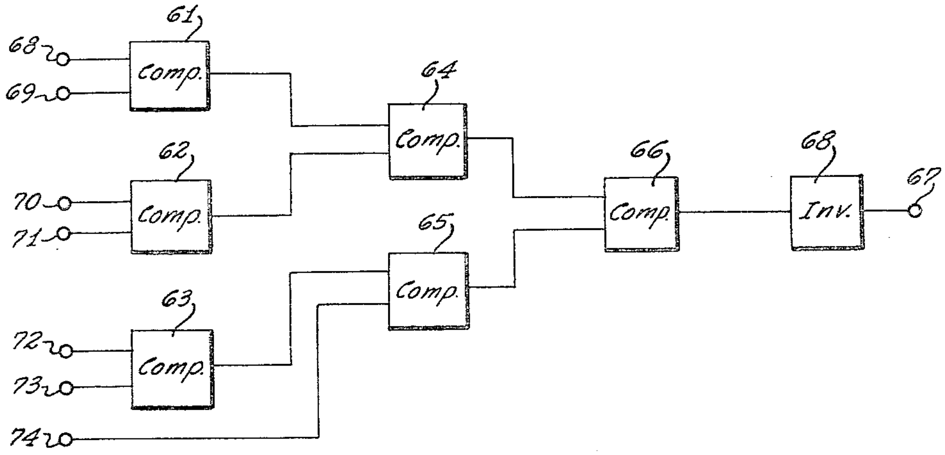
FIG. 3 is a block diagram of a parity bit generator comprising a plurality of comparing circuits, each comparing circuit being as shown in FIG. 2.

FIG. 3 shows how a plurality of comparing circuits, each being of the type shown in FIG. 2 and comprising NPN transistors, can be connected to form a parity bit generator. Comparing circuits 61, 62, 63, 64, 65, and 66 are connected in the same manner as are comparing circuits 11, 12, 13, 14, 15, and 16, respectively, of FIG. 1. Output 67 of phase inverter 68 will be at a high potential level if high potential levels are applied to an odd number of the input terminals 68 to 74, respectively, and output 67 will be at a low potential level if high potential levels are applied to an even number of the inputs 68 to 74, respectively.

While certain specific embodiments have been shown and described, it will, of course, be understood that various modifications may be made without departing from the invention. The appended claims are, therefore, intended to cover any such modifications within the true spirit and scope of the invention.

What is claimed is:

1. Parity checking means comprising in combination: first, second, third and fourth sources of binary signals, first, second and third pairs of transistors, each pair having first and second transistors, each transistor having a base, an emitter and a collector, means connecting the collectors of the transistors in each pair to provide an output, first low resistance means connecting the first source to the emitter of the first transistor of the first pair, second low resistance means connecting the second source to the emitter of the second transistor of the first pair, third low resistance means connecting the third source to the emitter of the first transistor of the second pair, fourth low resistance means connecting the fourth source to the emitter of the second transistor of the second pair, fifth low resistance means connecting the output of the first pair to the emitter of the first transistor of the third pair, sixth low resistance means connecting the output of the second pair to the emitter of the second transistor of the third pair, first high resistance means independent of any fixed biasing source connecting the first source to the base of the second transistor of the first pair, second high resistance means independent of any fixed biasing source connecting the second source to the base of the first transistor of the first pair, third high resistance means independent of any fixed biasing source connecting the third source to the base of the second transistor of the second pair, fourth high resistance means independent of any fixed biasing source connecting the fourth source to the base of the first transistor of the second pair, fifth high resistance means independent of any fixed biasing source connecting the output of the second pair to the base of the first transistor of the third pair, and sixth high resistance means independent of any fixed biasing source connecting the output of the first pair to the base of the second transistor of the third pair.

2. The invention in accordance with claim 1, wherein said parity checking means includes a voltage source, wherein the collectors of the first and second transistors in each pair are connected together to form a common junction which constitutes the output for its respective pair, wherein a respective high resistance means is provided connected between the common junction of each pair and said power supply, and wherein means including a second voltage source and a diode is connected to the common junction of each pair to provide a binary output therefrom having levels substantially equivalent to the levels provided by said binary sources.

3. The invention in accordance with claim 2, wherein an inverter is coupled to the output of said third pair of transistors, and wherein means including a diode is provided at the output of said inverter for providing a binary output therefrom having levels substantially equivalent to the levels provided by said binary sources.

References Cited by the Examiner

UNITED STATES PATENTS 3,001,711 9/1961 Frohman ----------- 235—176

MALCOLM A. MORRISON, *Primary Examiner.*

M. P. ALLEN, M. P. HARTMAN, *Assistant Examiners.*